April 30, 1929.  J. H. MANSFIELD ET AL  1,711,275
DOUBLE END TENONER
Filed April 25, 1927   8 Sheets-Sheet 1

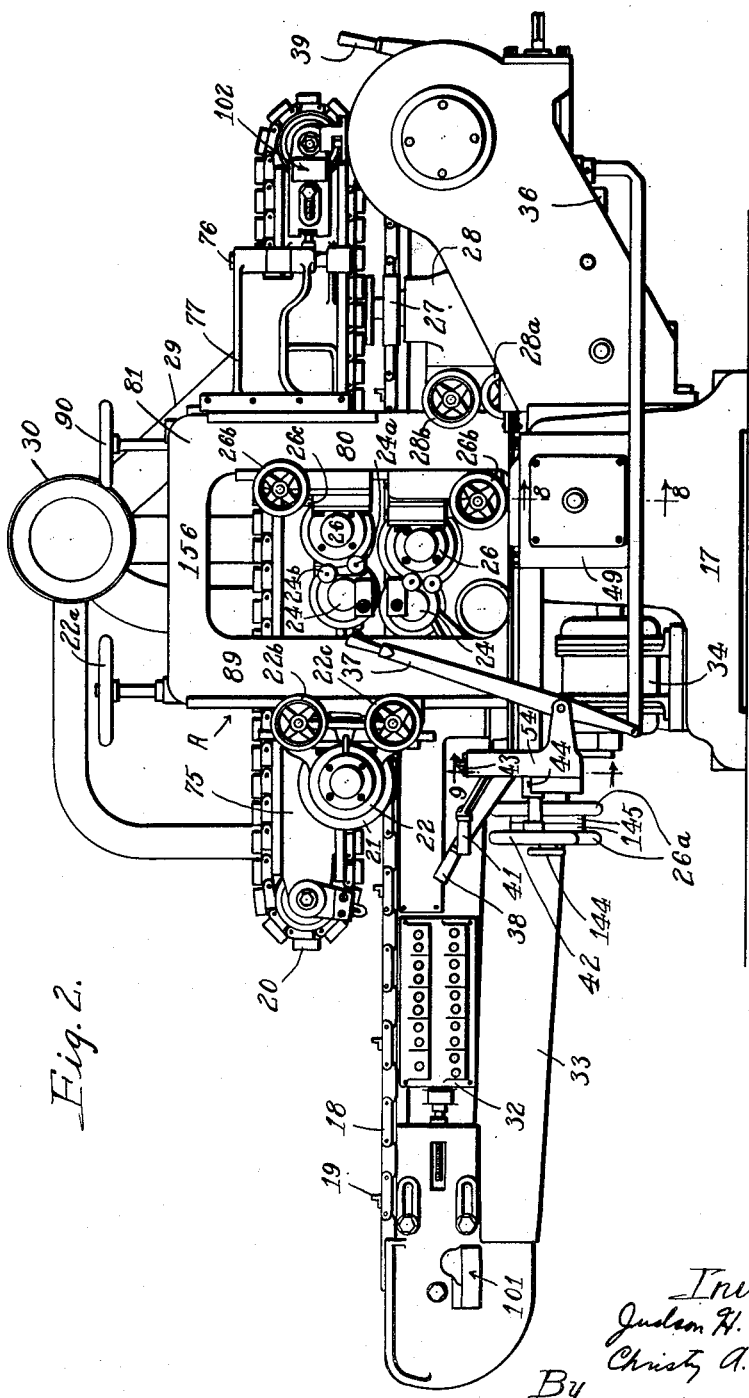

April 30, 1929.　　J. H. MANSFIELD ET AL　　1,711,275
DOUBLE END TENONER
Filed April 25, 1927　　8 Sheets-Sheet 3
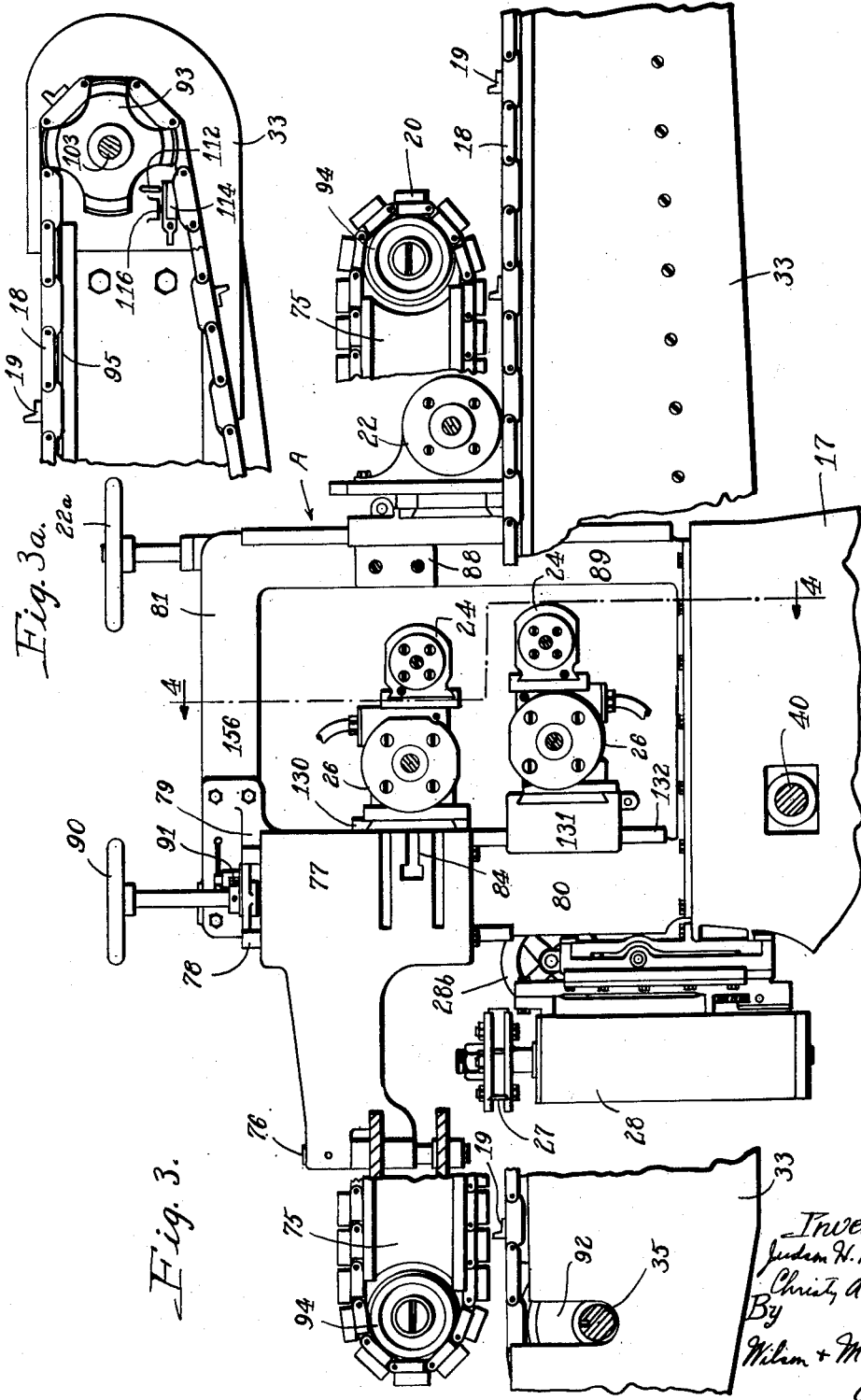

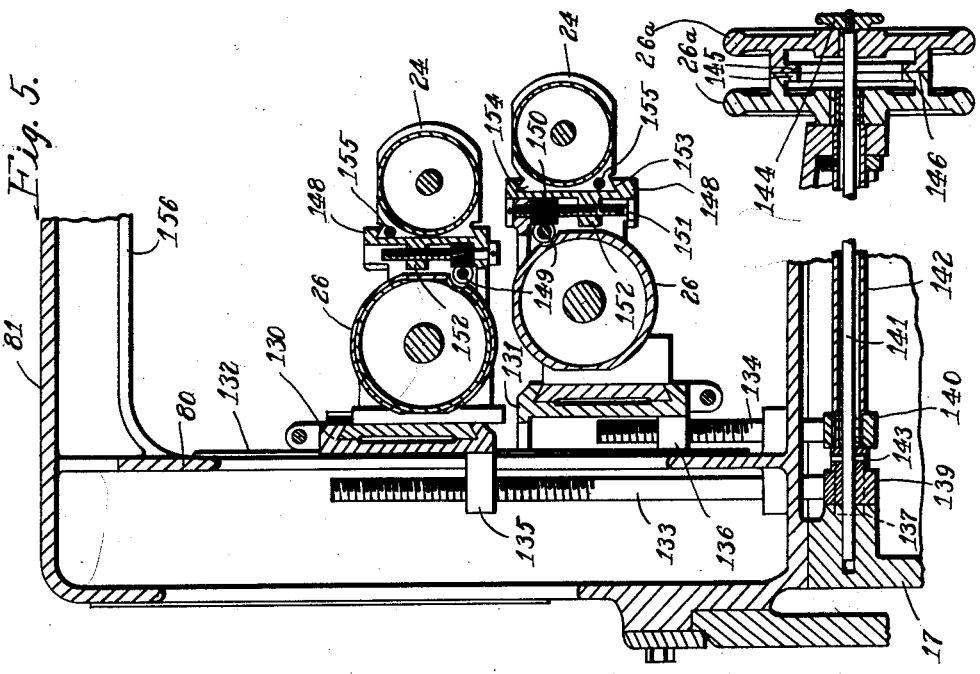
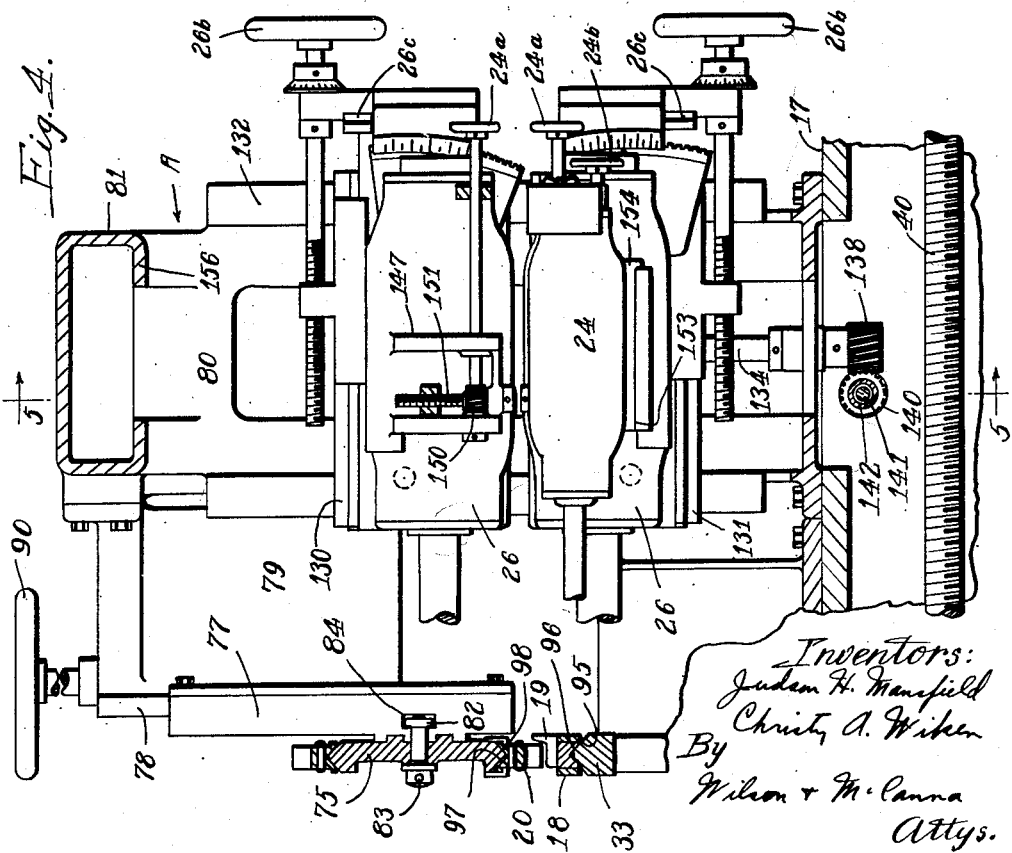

April 30, 1929.　　J. H. MANSFIELD ET AL　　1,711,275
DOUBLE END TENONER
Filed April 25, 1927　　8 Sheets-Sheet 5

Inventors:
Judson H. Mansfield
Christy A. Wiken
By Wilson & McCanna
Attys.

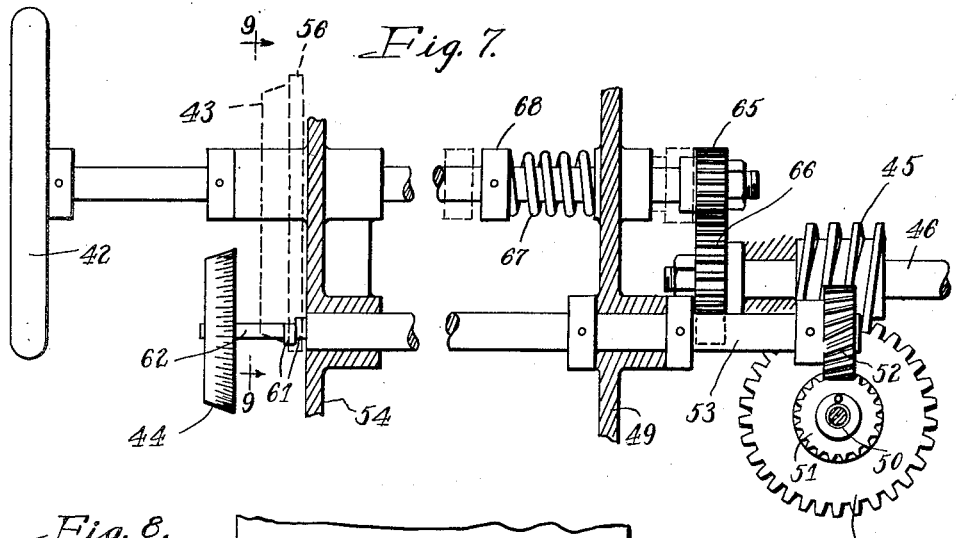
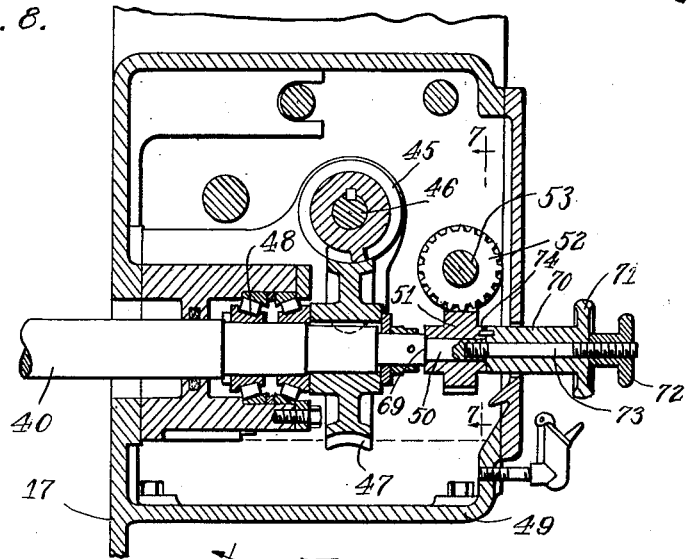
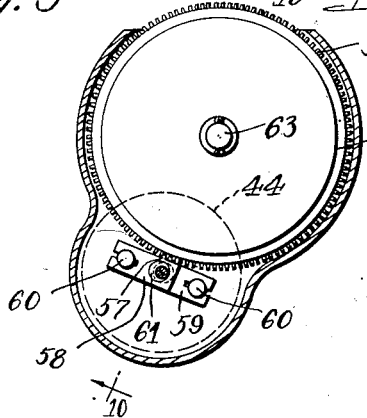
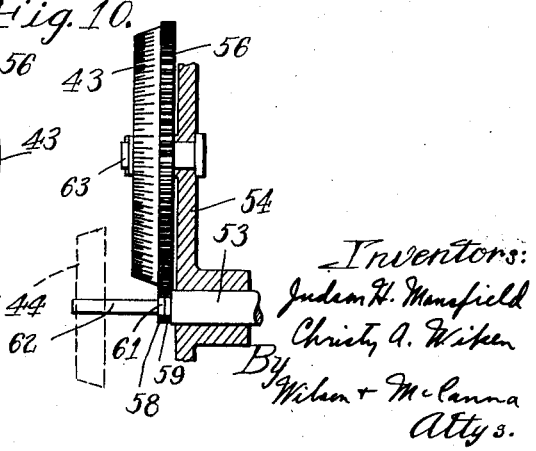

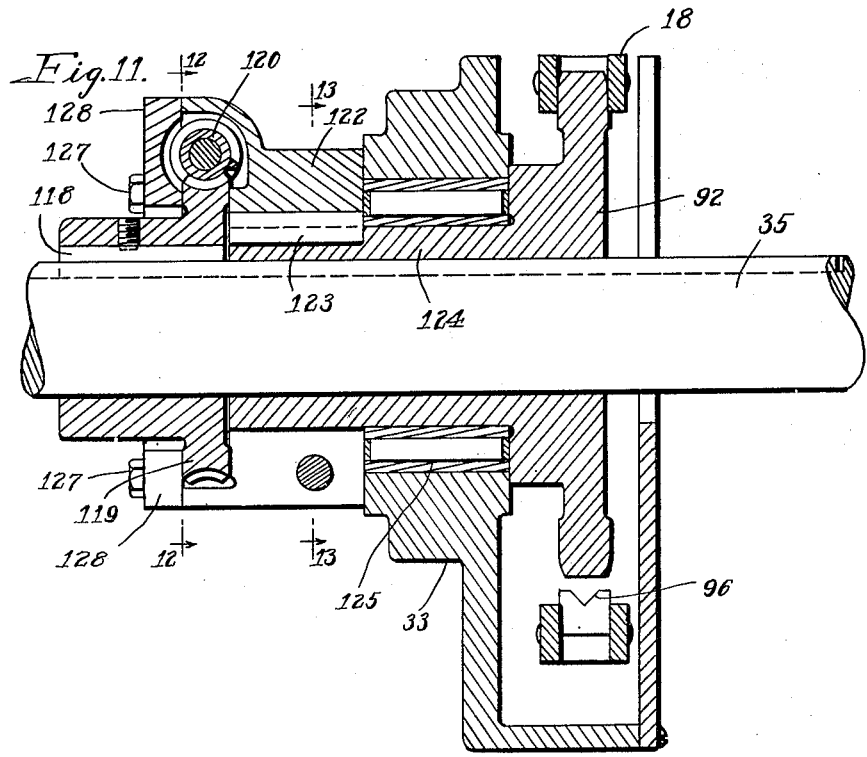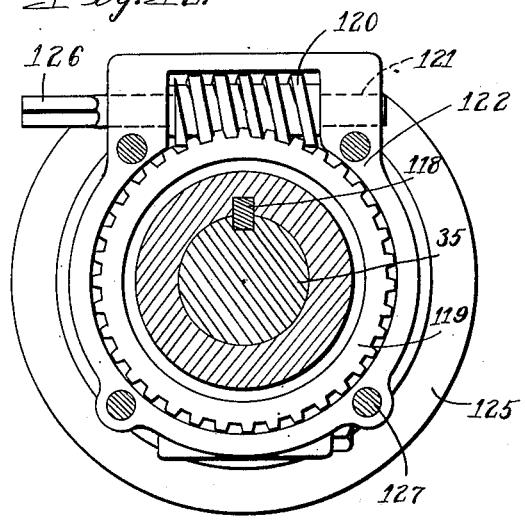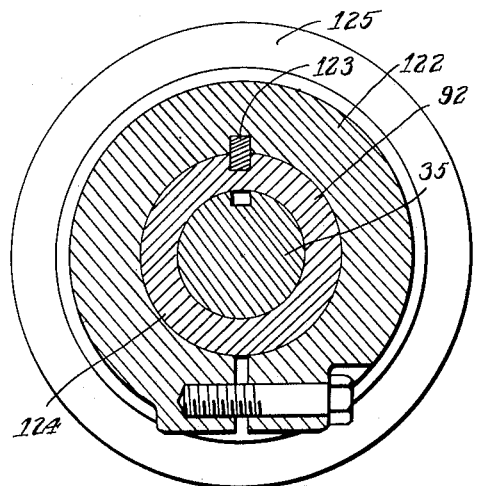

April 30, 1929.  J. H. MANSFIELD ET AL  1,711,275
DOUBLE END TENONER
Filed April 25, 1927   8 Sheets-Sheet 8

Inventors:
Judson H. Mansfield
Christy A. Wiken
By Wilson & McCanna
Attys.

Patented Apr. 30, 1929.

1,711,275

UNITED STATES PATENT OFFICE.

JUDSON H. MANSFIELD AND CHRISTY A. WIKEN, OF ROCKFORD, ILLINOIS, ASSIGNORS TO GREENLEE BROS. CO., OF ROCKFORD, ILLINOIS, A CORPORATION OF ILLINOIS.

DOUBLE-END TENONER.

Application filed April 25, 1927. Serial No. 186,467.

This invention relates to an electrically driven double-end tenoner for general woodworking shops adapted for a variety of equalizing, end shaping, and dadoing and other special work, such as cutting corner joints on drawers, cedar chests, etc., and squaring and rabbeting doors and similar framed-up stock. In short, the present machine is not intended simply for the purpose of cutting a straight tenon or joint on either end of a piece of stock and for cutting off, but is enlarged in its scope of uses to meet the present day requirements; as, for example, in its application to automobile body work, a tilting adjustment for the arbors is used in the cutting of angle tenons which are required to such a large extent in that class of work.

Among the more important features incorporated in the present machine may be enumerated the following:

1. The provision of a stationary right hand unit and a movable left hand unit. This is in direct contrast to other tenoners and is of considerable advantage in that it makes for greater convenience in the operation of the machine; the stock length indicator, as well as all controls, both electrical and mechanical, are always within easy sight and reach of the operator at his station so that he does not have to walk to and fro but keeps the machine under full control at all times from the one position.

2. The provision of a stock length indicator in the form of two dials operated from the feed screw through positive gearing, disposed at the operator's station for handiness in setting the machine, showing the distance between the right and left hand units, one graduated in feet and inches for quick power adjustment and the other in 64ths of an inch for precise setting by hand. This makes it a simple matter for the operator, unassisted, to change the set-up of the machine for different runs of stock.

3. The provision of pressure bars or holddowns hingedly mounted on vertical axes for swinging movement laterally in a horizontal plane relative to the feed chains so as to permit easy access to the cutter heads and saws as required from time to time when the machine is in service, the said bars when swung to an out of the way position being supported solely by their pivots and not requiring props, as in the case of those arranged to swing on a horizontal axis, where there was always a likelihood of the bars falling on the operator because of the prop being dislocated.

4. The provision of V chain ways for the feed and hold-down chains. These prevent side movement, eliminate all guides, and insure a true, straight line course for the stock in feeding through the machine, and make it possible to cut tenons within the closest practicable limits of accuracy.

5. The provision in connection with the feed and hold-down chains of mechanically operated automatic oilers together with wipers for removing dust or shavings from the V grooves of the chain links. This feature is very important in that it provdies lubrication for the chains only so long as they are in actual operation for feeding work through the machine. Gravity or pressure oilers on the other hand would require shutting off whenever the machine was stopped and would be liable to cause a deposit of oil on the rubber blocks or pads of the feed chain links and thereby cause the oil to come in contact with the work and be otherwise objectionable.

6. The provision of an adjustment for one of the feed chain sprockets which permits feeding stock through the machine at any desired angle for the cutting of angle tenons. This adjustment is of an improved form whereby very close precision can be gotten by simple hand adjustment and provision is made for clamping the parts in their adjusted condition.

7. The provision in connection with the top and bottom tenoning heads disposed above and below the feed bed at the opposite sides thereof of separate adjusting wheels for the top and the bottom heads for the individual vertical adjustment thereof, the wheels being provided with means for detachably locking the same together frictionally, whereby when a certain spaced relation of the heads has been secured the heads may be adjusted together up or down to the proper elevation with the spaced relation, to within a thousandth of an inch or so of any desired dimension, maintained in any position of adjustment. This feature obviously facilitates the matter of setting up the machine.

8. The provision in connection with the tenoning heads of scoring saws for cutting through the thickness of the veneer in veneered stock so as to avoid splintering and make clean cuts. The scoring saws are preferably adjustably mounted on the tenoning heads so as to be adjustable therewith in elevation while maintaining a certain definite adjusted relation to the tenoners, thus further facilitating the matter of setting up the machine.

9. The provision in the case of both the right and left hand units of hollow frames for the mounting of all of the motors thereon for the operation of the cutter heads and saws wherein, in place of separate standards, there is utilized a one-piece hollow frame providing two standards with a connecting reinforcing arch, the one standard providing a place for mounting a trim saw and the other standard providing a place for mounting the tenoning heads with their scoring saws on one side of the standard and the coping head on the other side thereof. The unitary integral construction is obviously far more rigid than a construction using separate standards and, moreover, the frames may individually be of a much lighter and consequently cheaper construction.

The invention includes various other features as will appear in the course of the following detailed description wherein—

Fig. 2 is a right side view;

Fig. 3 is a slightly enlarged vertical section taken on the line 3—3 of Fig. 1 looking at the inner side of the right hand unit, the feed bed and pressure bar being broken away to reveal the heads and saws therebehind;

Figure 1:
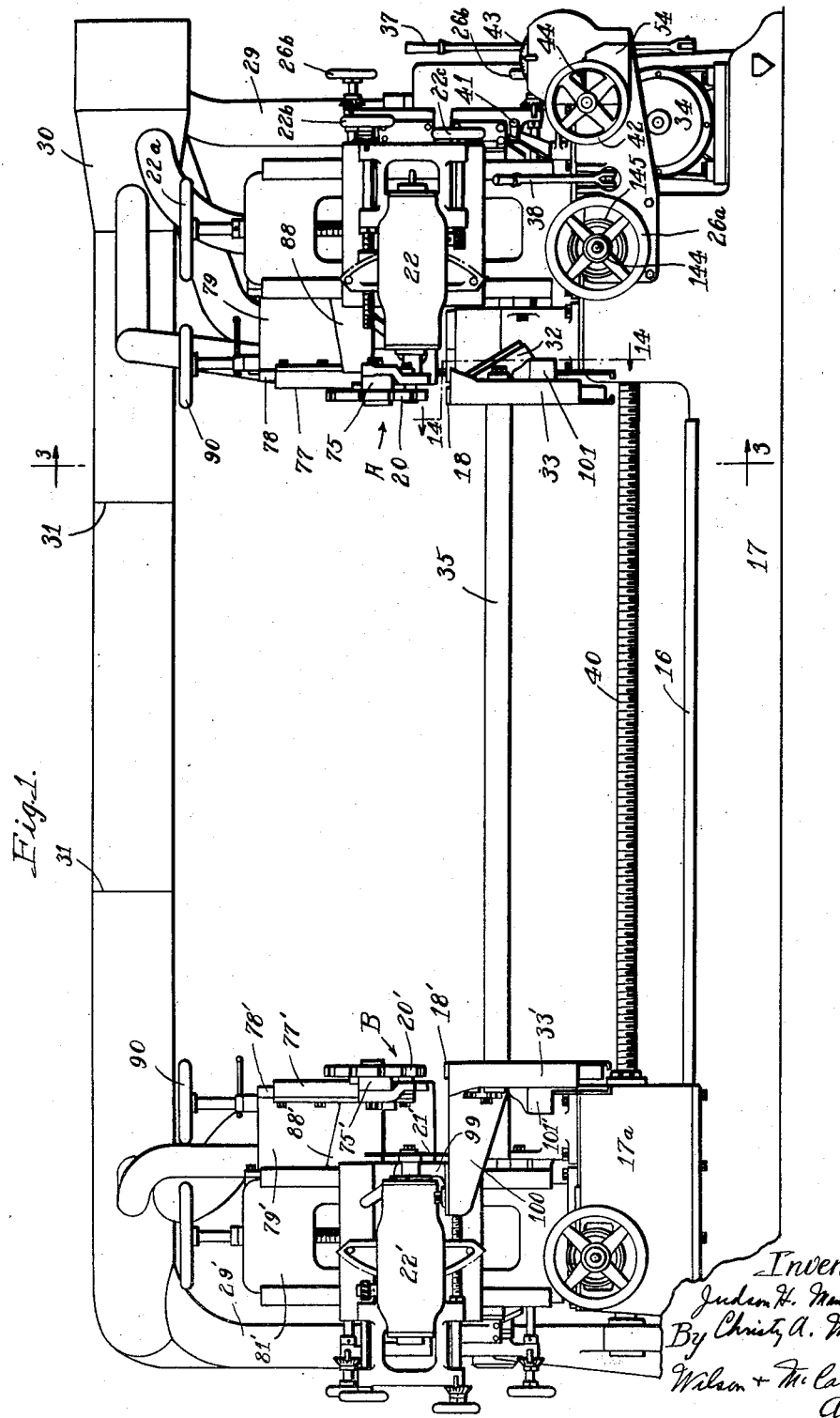
Figure 1 is a front view of a double-end tenoner conforming to our invention.
Figure 6:
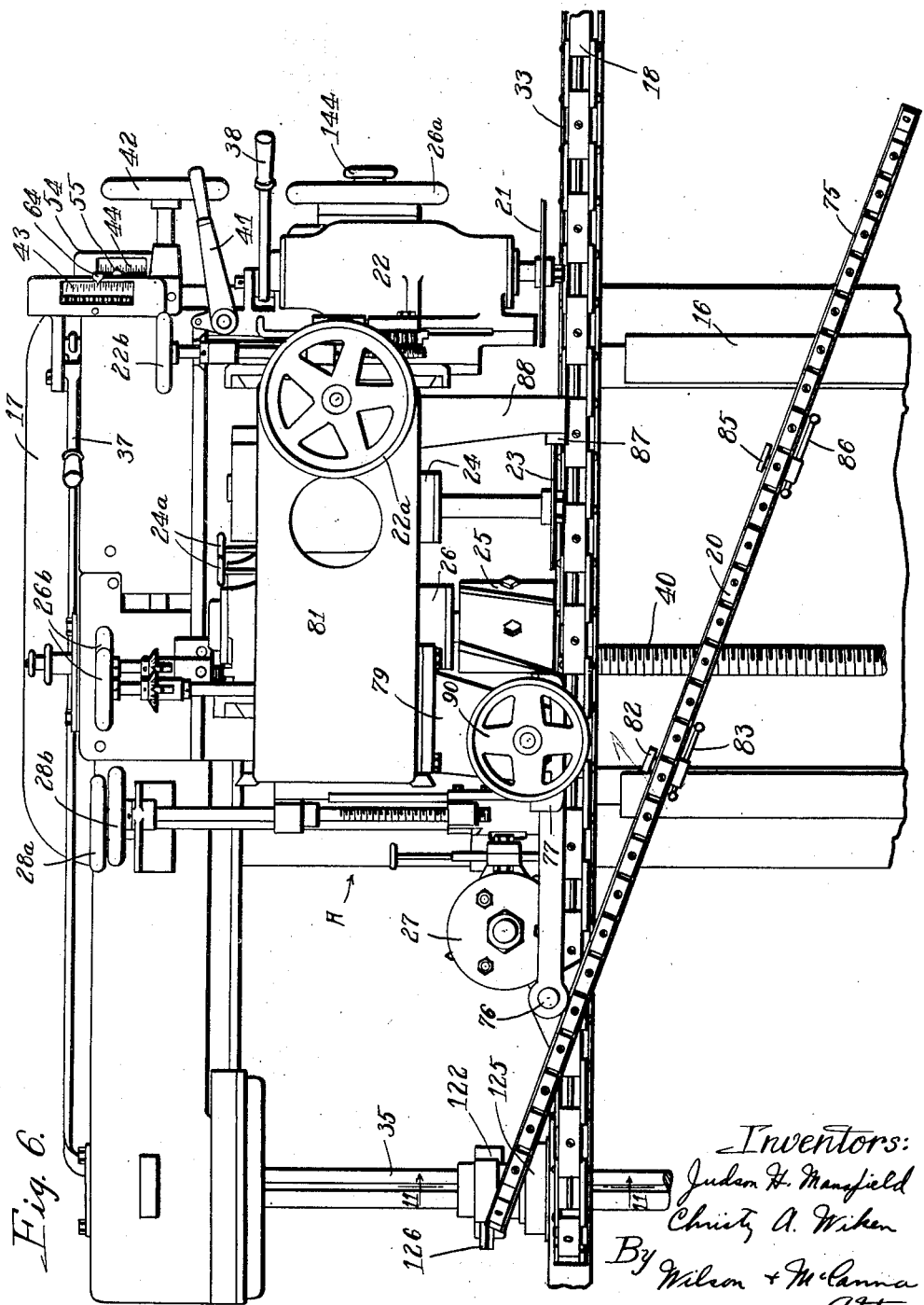
Figure 14:
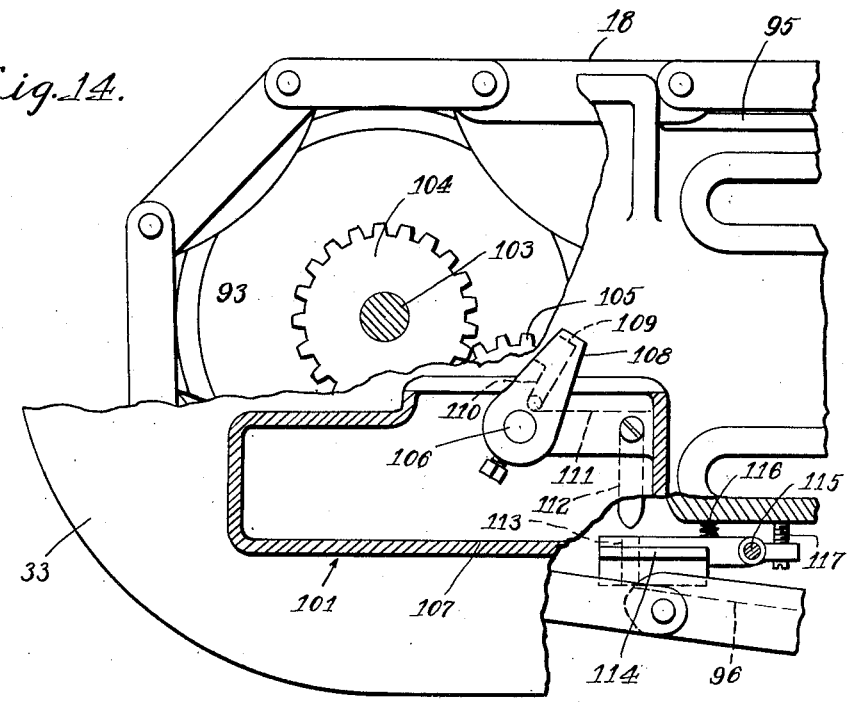
Figure 15:
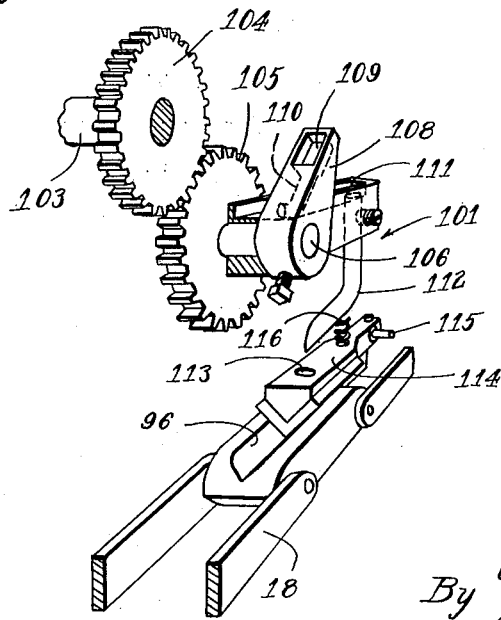

Fig. 3ª is a continuation of the right hand end of Fig. 3 with the sheet metal guard removed from the inner side of the feed bed to show the feed chain sprocket as well as the wiper of the automatic oiler;

Fig. 4 is a vertical section through the right hand unit on a still further enlarged scale taken on the broken line 4—4 of Fig. 3;

Fig. 5 is a cross-section through Fig. 4 taken on the line 5—5 thereof, an intermediate portion of the machine between the two heads and the two adjusting wheels therefor being broken away to conserve space on the drawing, while still making the mode of operation clear;

Fig. 6 is a plan view of Fig. 3 showing the pressure bar with the hold-down chain swung in toward the center of the machine to afford access to the tenoning heads;

Fig. 7 is a fragmentary sectional detailed view taken on the line 7—7 of Fig. 8 showing the hand and power means for adjusting the movable left hand unit, the stock length dial for 64ths of an inch being shown in full lines and the dial for feet and inches being shown in dotted lines;

Fig. 8 is an enlarged sectional detail taken on the line 8—8 of Fig. 2 showing the hand-operable means for setting or resetting the dials;

Fig. 9 is a sectional detail taken on the line 9—9 of Fig. 7; and Fig. 10 is a cross-section through Fig. 9 taken on the line 10—10 thereof the two views showing the operating connection between the dial for 64ths of an inch and the dial for feet and inches;

Fig. 11 is an enlarged sectional detail taken on the line 11—11 of Fig. 6 showing the feed chain sprocket adjusting means;

Fig. 12 is a transverse section on the line 12—12 of Fig. 11; and Fig. 13 is a transverse section on the line 13—13 of the same figure;

Fig. 14 is an enlarged sectional detail taken on the line 14—14 of Fig. 1, showing the automatic oiler for the feed chain, a similar oiler being provided for the hold-down chain; and Fig. 15 is an isolated perspective detail better to illustrate the operating connection between the chain sprocket and the automatic oiler as well as the relation between the wiper fed by the oiler and the chain lubricated thereby.

The same reference numerals are applied to corresponding parts throughout the views and the sections are all taken looking in the directions indicated by the arrows.

Referring for the present more particularly to Figs. 1 to 3 and 6 for a preliminary general understanding of the machine with which the present invention is concerned, it will be observed that the machine comprises a right hand unit A and a left hand unit B, the unit B being movably mounted on ways 16 provided on the base 17, while the unit A is stationary and in part is an integral extension of the base. The two units are of practically identical construction except that the parts of unit A are disposed for operation on the right hand end of the stock while those of unit B are properly disposed for operation on the left hand end. Furthermore, the operator's station is at unit A and all of the controls, electrical and mechanical, are provided on the unit A within convenient reach of the operator. By reason of the identity in the two units, apart, of course, from the control features thereof as just referred to, whenever there are corresponding parts on the two units, the corresponding parts on unit B will be referred to by prime numbers.

The stock to be operated upon is fed through the machine on a feed bed consisting of two endless feed chains 18 and 18', the chains being equipped with dogs 19 to engage the work positively at both ends to feed it through the machine. The stock, upon entering the in-feed end of the machine, passes under rubber-padded hold-down chains 20 and 20' which insure the proper relationship of the stock to the various heads and saws arranged to operate thereon. Tracing for the moment the passage of only the right hand end of the stock through the machine, inasmuch as the operations at the left hand end are identical, the stock first encounters a trim saw 21 driven by the electric motor 22. This saw cuts off the stock to the proper length. The stock then feeds in between upper and lower scoring saws 23 driven by electric motors 24. These saws mark off by scoring through the veneer of the work the area later operated upon by the tenoning heads 25 driven by the electric motors 26. A tenon is thus formed the thickness of which is determined by the spaced relation of the tenoning heads. The scoring saws insure a clean cut by cutting through the veneer which might otherwise be torn up by the tenoning heads. The stock after passage between the tenoning heads feeds to the coping head 27 driven by the electric motor 28. The head 27 has the blades thereof properly profiled to fashion the tenon to the usual ogee form, or to any other form desired. This completes the series of operations to be performed and the stock is discharged from the out-feed end of the machine. An attendant may be stationed there to take care of the stacking of the pieces or the loading thereof onto a truck for transportation from the machine to another point in the shop. The saw dust and shavings resulting from the various operations performed is conducted through branch pipes 29 to the exhaust pipe 30 leading from the machine. The precise form of the hoods and guards employed in connection with the pipes 29 about the saws and heads is unimportant so far as the present invention is concerned, and so far as the exhaust pipe 30 is concerned, it will be obvious that a telescoping joint is necessitated at 31 to accommodate the narrowing and widening of the machine required in operating on different lengths of stock.

The trim saw motor 22 is capable of vertical, horizontal and tilting adjustment by means of the hand wheels 22ª, 22ᵇ and 22ᶜ, respectively, to position the saw 21 according to the requirements of any particular job encountered. The motors 26 and 28 have similar adjustments. The hand wheels for vertical adjustment of the tenoning head motors are designated 26ª, those for horizontal adjustment 26ᵇ, and crank studs for tilting adjustment are shown at 26ᶜ (Fig. 4). The other adjustments do not appear with the exception of the vertical and horizontal adjustments 28ª and 28ᵇ for the coping head motor 28. No invention, generally speaking, is claimed in the provision of the three kinds of adjustment and the details thereof will not, therefore, be described except that a novel feature employed in connection with the vertical adjustments 26ª for the tenoning head, illustrated in Fig. 5, will be described at length hereinafter under a separate head. Vertical and horizontal adjustments for the scoring saw motors 24 are indicated at 24ª and 24ᵇ, respectively, in Fig. 4 and further description regarding the mounting of the scoring saw motors on the tenoning head motors 26 will be given under a separate head hereinafter. After this brief introductory description the various phases of the invention will now be considered under separate heads substantially in the order in which the features were first briefly discussed.

*Movable left hand unit.* (*See Figs. 1 and 2.*)

The operator is stationed at the right hand unit A in order to be within convenient reach of the various electrical and mechanical controls. Thus, a switch panel 32 is provided on the side of the feed bed rail 33 at the operator's position for the control of the motors 22, 24, 26 and 28 on the right hand unit A and the corresponding motors on the left hand unit B, and the feed motor 34. The latter is arranged to have a driving connection with a feed shaft 35 to operate the feed chains 18 and 18′, there being change gearing in the housing 36 under the control of the hand lever 37 to secure three rates of feed. The transmission between the motor 34 and the gearing in the housing 36 includes a safety feed clutch (not shown), which prevents breakage by simply releasing, so that the operator is warned in case the stock jams in the machine. Aside, however, from the automatic releasing of the clutch, instant starting and stopping of the machine may be brought about by operation of a lever 38 at the in-feed end of the machine within convenient reach of the operator at his position, or by a lever 39 at the out-feed side. A two-way clutch (not shown) serves to transmit power in either direction to the adjusting screw 40 under the control of a hand lever 41 at the operator's position. Or, as will more clearly appear hereinafter, the screw 40 may be operated manually by means of the hand wheel 42, the operation of the screw in either case resulting in the narrowing or widening of the machine to accommodate different lengths of stock. In the power operation of the adjusting screw the operator observes the dial 43 to determine roughly the distance between the right and left hand units A and B and when the left hand unit is brought fairly close to the proper posiion of adjustment he disengages the clutch by means of the lever 41 and thereafter makes whatever fine adjustment is required by turning the hand wheel 42. In this operation he is guided by observing a second dial 44. The latter indicates the distance between the units in terms of 64ths of an inch, whereas the dial 42 indicates the distance in terms of feet and inches. With this much description the advantages in having the right hand unit fixed and the left hand unit movable should be apparent; the bulk of the controls, electrical and mechanical, are situated at the right hand unit where it is most natural for the operator to stand in controlling the machine and the thought is to avoid any necessity for the operator having to shift to and fro to keep the machine under full control at all times. The movable unit B, on the other hand, is devoid of any controls except those which pertain to the adjustment of the saws and heads thereon. In short, it is light weight in comparison to the fixed right hand unit and designed for mobility and may be adjusted in relation to the fixed unit with a minimum of power consumption or manual effort.

*Stock length indicator.* (*See Figs. 1 and 7–10.*)

The dials 43 and 44, as previously stated, indicate the distance between the units A and B and thereby serve in the capacity of stock length indicators. The dials are mechanically connected by positive gearing with the adjusting screw 40 so as to be operated thereby whenever the machine is narrowed or widened. In the power adjustment of the screw 40 the worm 45 is driven by a shaft 46 which in turn is driven in either direction by the motor 34 through the two-way clutch, previously referred to, under the control of the lever 41. The worm 45 meshes with a worm gear 47 keyed to the end of the screw 40 where the latter is received in bearings 48 in a housing 49 at the right hand end of the base 17. The screw 40 has a reduced extension 50 on which a spiral gear 51 is received and arranged normally to turn with the screw 40. The gear 51 meshes with another spiral gear 52 fixed on an index shaft 53 extending from the housing 49 to a bracket 54 at the operator's position where the dials 43 and 44 are situated. The dial 44 is mounted on the end of the index shaft to turn with reference to an index finger 55 on the bracket 54, (see Fig. 6). The dial 44 has a reduction drive connection with the dial 43 so that the latter is advanced intermittently step by step in the continuous rotation of the former. The driving connection is such that the dials are always geared together so that one dial will not be free to turn independently of the other at any time and still the dial 43 is advanced only step by step in the continuous turning of the dial 44, the purpose being to facilitate the reading of the dials and make it easier to gauge the adjustment of the movable unit. I employ spur gear teeth 56 on the dial 43 with which two teeth 57 on a pair of reciprocating and oscillating slides 58 and 59 are arranged to engage. The slides 58 and 59 are pivotally and slidably mounted with reference to the bracket 54 on pins 60 and have openings therein for the reception of eccentrics 61 provided on the reduced end 62 of the shaft 53. In the continuous rotation of the shaft 53 with the screw 40 the dial 43 is turned about its pivot 63 relative to index finger 64 (see Fig. 6), the equivalent of two teeth of the gear 56 for each rotation of the index shaft 53. The drive ratio between the gear 56 and the shaft 53 is 128 to 2 so that the dial 44 may be graduated in 64ths of an inch, while the dial 43 may be graduated in feet and inches. It will now be apparent that during the power adjustment of the screw the dial 44 will be turning fairly rapidly so that its readings can not be read by the operator. The dial 43, however, can be read since it is advanced step by step for each inch of narrowing or widening of the machine. The operator during the power adjustment observes the dial 43 and keeps the clutch for the power adjustment engaged until the machine is brought fairly close to the desired adjustment whereupon he disengages the clutch by operation of the lever 41. The close adjustment of the machine to the precise point desired is then accomplished by use of the hand wheel 42. The placing of the dials and the controls all in one group within easy sight and reach of the operator enables settings to be made with ease and facility. It will be observed that the hand wheel 42 has a gear 65 on its shaft which is normally held out of meshing engagement with a gear 66 by a compression spring 67 acting between the wall of the housing 49 and a collar 68 fixed on the shaft. The disengaged position of the gear 64 is indicated in dotted lines. When the hand wheel 42 is pushed in against the action of the spring 67 to engage the gear 64 with the gear 66 the worm 45, and hence the screw 40, may be operated by hand. During the hand adjustment the dials 43 and 44 are operated as before with the exception, of course, that the dial 44 will turn slowly enough for the operator to gauge the adjustment thereby, to bring the movable unit precisely to the desired point for a particular length of stock to be operated upon.

A correction of the dial reading is required when some change is made in the machine so that the dials no longer give a true stock length reading. The tilting of the tenoning and coping heads is an instance of such a change although still other kinds of changes might be mentioned. For this reason the driving connection between the gear 51 and the screw 40 is a detachable one. The gear 51 is clamped between the shoulder 69 on the screw 40 and the hub 70 of a dial adjusting wheel 71 by means of a nut 72 on the stem 73 which threads at one end in the extension 50 of the screw 40, as shown. When the nut 72 is loosened the gear 51 may be turned independently of the screw 40 by the wheel 71 through the pin connection, indicated at 74. After the desired adjustment has been made the nut 72 may be tightened again to resume the normal operating connection between the screw 40 and the two dials. In making the correction the operator, after properly setting the heads to the desired angle, runs a test piece of stock through the machine, measures the same, and then corrects the reading of the dials in the manner just described so that thereafter those dials will correctly indicate the length of stock. Of course, in resetting the dials the same steps referred to above have to be taken. That is, after the heads have been reset to their normal horizontal and vertical positions, a piece of stock is run through the machine, is measured, and the dials are reset accordingly.

*Hinged pressure bars.* (*See Figs. 3 and 6.*)

When the machine is in service it frequently becomes necessary for the operator to get at the tenoning heads for the purpose of sharpening or replacing blades and trueing up the heads, or for the purpose of mounting new heads on the mandrels. Inasmuch as the tenoning heads 25 and the scoring saws 23 operated in connection therewith are disposed immediately behind the pressure bar 75 it would be extremely difficult, if not impossible, to get at them were it not for the fact that we have made provision whereby the pressure bar may be swung away from the heads to afford access thereto. The bar 75, and its companion bar 75′ likewise, is hingedly mounted on a vertical axis near one end, as indicated at 76, on an extension of a bracket 77 mounted on ways 78 provided on a bracket 79 fixed to and extending from one side 80 of a hollow rectangular frame 81 suitably bolted to the base 17. The corresponding frame 81′ of the unit B is bolted to the slidable base 17ª operating on the ways 16. The bar 75 is held normally in its operative position directly above and parallel with the bed rail 33 by means of a latch 82 mounted intermediate the ends of the bar and arranged to be clamped by a screw operated by a handle 83. The latch 82 is entered through the end of the T-slot 84 provided in the bracket 77 and is then arranged to be tightened by means of the handle to lock the bar in position, as indicated in Fig. 4. Still another latch 85 is clamped in a similar way by a handle 86 and engages behind a lug 87 provided on a bracket 88 fastened to the other side 89 of the frame 81. The bracket 77 may be adjusted vertically relative to the bracket 79 by means of a hand wheel 90 having a screw operating in a nut on the bracket 77. The pressure bar 75 is thereby adjusted in relation to the bed rail 33 to secure the proper clearance between the feed chain 18 and the hold-down chain 20 for the particular thickness of stock being operated upon. After the proper adjustment of the hand wheel 90 has been made the same may be locked by means of a clamp screw 91.

From this description it will appear that the operator can get at the tenoning heads with very little difficulty by simply unlatching the pressure bar at 82 and 85 by means of the handles 83 and 86, respectively, and swinging the bar with its hold-down chain complete inwardly about the hinge connection at 76. When the bar is swung out of the way in this manner the tenoning heads are fully exposed for the operator to make what changes or adjustments may be required and, since the bar is adequately supported by its pivot, there is no need for the use of props as in the case of a bar swinging on a horizontal axis, the props used in cases having been found to constitute a real hazard to the operator because accidental dislocation thereof meant the falling of the bar onto the operator.

*V chain ways.* (*See Figs. 3 and 4.*)

The feed chain 18 is driven by a sprocket 92 on the fed shaft 35 at the out-feed end and operates over an idler sprocket 93 at the in-feed end of the machine. The hold-down chain 20, on the other hand, operates idly by engagement with the stock passing under the same and has idler sprockets 94 at the in-feed and out-feed ends thereof. The bed rail 33 of the feed bed provides a V chain way 95 along the top thereof to fit V grooves 96 in the center links of the feed chain 18. The pressure bar 75, in a similar manner, has V chain ways 97 on its upper and lower edges to fit the V grooves 98 of the hold-down chain 20. Thus, the feed and hold-down chains are both held to a straight line course in moving from the in-feed end to the out-feed end of the machine. The necessity for absolutely straight line movement of the stock will be apparent when it is considered how accurately the setting of the heads and saws are made and also how carefully the right and left hand units are properly set for a given length of stock. The use of a feed mechanism which would not insure accuracy in the positive feeding of the stock through the machine would make it futile to strive for accuracy in the rest of the make-up of the machine. In other words, the practical success of the machine relies on the feeding of the stock in a true straight line course. With both the bed rail 33 and the pressure bar 75 constructed with V chain ways to keep the feed and hold-down chains on a true straight line course it will be manifest that it is practically impossible for the stock to get out of line. The only precaution the operator or feeder has to take in feeding the stock into the machine is to place the same onto the feed chain with one end of the stock abutted against a gauge block 99 provided on a bracket 100 extending from the left hand bed rail 33′ (see Fig. 1). Once the stock is properly placed on the feed bed and enters beneath the hold-down chain there is no likelihood of a miscut. The present chain ways also permit the setting of the heads and saws vary close to the chains and are also superior to other types commonly used in that they do not accumulate dirt, grit and shavings thereon, which affect the trueness of the chain run and also cause wear. However, we claim no invention in this feature of the machine.

Mechanically operated oilers. (See Figs. 2, 14 and 15.)

The feed and hold-down chains 18 and 20, respectively, are both suitably equipped with oilers operated mechanically in the operation of the chains. Such oilers, while not claimed in this application, are indicated in Fig. 2 at 101 and 102 on the side of the bed rail 33 and pressure bar 75, respectively, for the lubrication of the feed chain 18 and hold-down chain 20. Inasmuch as they are practically of identical construction and operate in substantially the same manner a description of the oiler 101 will suffice for both. Both oilers are operated through a driving connection with a chain sprocket. The idler sprocket 93 for the feed chain 18 is mounted on a shaft 103 suitably received in bearings in the rail 33 and has a gear 104 arranged to turn therewith whenever the same operates for the feeding of stock through the machine. The gear 104 meshes with a gear 105 fixed on the shaft 106 received in a bearing in a side wall of the oil well 107. A rotary dipper 108 is fixed on the inner end of the shaft 106 to scoop up a slug of oil in the pocket 109 from the well 107 once in each rotation of the dipper. The oil picked up flows by gravity through the duct 110 into a trough 111 provided alongside the dipper. The trough empties into a pipe 112 to conduct the oil to the oil hole 113 provided in a wiper 114 pivotally mounted at 115 for operation against the inside of the lower flight of the feed chain. The wiper is suitably felted to absorb the oil and deposit it uniformly in the V grooves 96 provided in the center links of the feed chain. The felt of the wiper 114 also serves to clean off any deposits of dust or dirt so that the chain will function properly on its ways. A spring 116 serves to exert a light pressure on the wiper toward the chain to insure the proper cooperation between the parts while an adjustable set screw 117 arranged to engage under a lug on the bed rail 33 limits the movement of the wiper so that it will not foul with the chain.

It will be manifest that these oilers supply lubricant for the chains and their ways only to the extent required and only when the chains are operated. With any other type of oiler, as for example those that have to be turned on and off by the operator and are apt to be forgotten at times, there is the two-fold danger either that the oil will be supplied in profuse amounts onto the chains or chain ways and be transmitted to the work and be otherwise objectionable, or that the operator might forget to open the oilers or might not open them enough so that there would be insufficient lubrication. Other types of oilers also require too much attention and are always apt to get out of order. In short, any oiler other than a mechanically operated oiler is unsuited to use in a machine of the present character because it is not likely to furnish the proper amount of lubricant but has always been found to furnish either too much or too little.

Feed chain sprocket adjustment. (See Figs. 6 and 11–13.)

The two feed chains 18 are always operated in unison by the feed shaft 35 but the sprocket 92 is arranged to be adjusted angularly with respect to its companion drive sprocket so that the feed chain 18 may be offset endwise to a certain extent with relation to the other feed chain 18'. In other words, one of two feed dogs 19 which are normally in line longitudinally of the machine is given a certain amount of lead with respect to the other dog and the work fed thereby through the machine is caused to pass through at an angle to the normal longitudinal axis. In this way, the machine is adapted for the cutting of angles. It will be observed that the feed shaft 35 is splined. This is partly for the purpose of having a sliding driving connection with the companion sprocket for the sprocket 92 on the movable left hand unit B so that the feed shaft has a driving connection with the feed chain 18' in all positions of adjustment of the movable unit. The spline, however, also provides a driving connection through a key 118 with a worm gear 119. The latter has a worm 120 meshing therewith rotatable in bearings 121 in a collar 122 keyed as at 123 to the hub 124 of the drive sprocket 92. The latter is received in a bearing 125 provided on the bed rail 33. The worm 120 has a crank stud 126 whereby the worm may be turned to thread about the periphery of the worm gear 119. The turning of the worm 120 in one direction will obviously adjust the sprocket 92 in a certain direction angularly with respect to the worm gear 119 and, of course, the rotation of the worm in the opposite direction will produce adjustment of the sprocket in the reverse direction. Manifestly the feed chain 18 may be thereby advanced or retarded in relation to its companion feed chain 18'. After the adjustment has been made the sprocket 92 is arranged to be clamped with reference to the collar 122 and worm gear 119 by the tightening of screws 127 although, as a matter of fact, the parts are self-locking in their adjusted positions by reason of the worm meshing in the worm gear. The screws 127 pass through a cover plate 128 into the collar 122 and when tightened serve to clamp the worm gear 119 between the plate 128 and the side of the collar 122. The clamping of the parts together into a rigid unit insures against the likelihood of the adjustment being tampered with after the machine has been accurately set and also removes from the adjusting mechanism the strains incident to the driving of the feed chain 18. The facility and accuracy with which adjustments may be made will no doubt be clear from the foregoing. The adjustment is of a simple and workmanlike construction. It will be manifest that the machine is considerably broadened in its possible range of uses by reason of the feed chain sprocket adjustment.

*Interconnected vertical adjustments for the top and bottom tenoning heads. (See Figs. 1-5.)*

The hand wheel $26^a$ for the vertical adjustment of the tenoning head motors 26 were previously briefly refered to. It has been found that it is a very tedious operation to accurately adjust the heads both to the proper elevation and to the proper spaced relation. According to the present invention it is possible after the heads have been brought to a desired spaced relation, accurately to within a thousandth of an inch or so of any desired dimension to adjust them together to the proper elevation without danger of throwing the heads out of their accurately adjusted spaced relation. The upper and lower motors 26, as best appears in Figs. 3-5, are mounted on separate brackets 130 and 131, respectively, mounted on ways 132 inside the hollow frame 81 on the side 80 thereof, the latter serving as a standard. It is with reference to the brackets 130 and 131 that the motors 26 have horizontal and tilting adjustment at $26^a$ and $26^b$. The vertical adjustments we secure by means of screws 133 and 134 threading in openings provided in the lugs 135 and 136 on the brackets 130 and 131, respectively. The screws 133 and 134 are fitted with spiral gears 137 and 138, respectively, meshing with spiral gears 139 and 140 on the shaft 141 and sleeve 142, respective. The gear 139 is pinned, as indicated at 143, on the shaft 141, while the gear 140 is keyed on the sleev 142. This point is mentioned especially for the reason that it permits the locking together of the two wheels $26^a$ by means of a nut 144 threading on the end of the shaft 141. The one wheel is keyed on the shaft 141 and the other wheel is keyed on the sleeve 142. When the nut 144 is tightened the rims 145, arranged in facing relation on the two wheels $26^a$, are pressed together to hold the faces 146 of the two rims in tight frictional engagement so that when one wheel is turned the other wheel is turned with it; the two being locked together in absolutely any position of relative adjustment. In operation the nut 144 is normally loose so that the two wheels $26^a$ may be adjusted independently of one another. Thus, the desired spaced relation between the two tenoning heads 25 may be secured with little or no difficulty as either head may be raised or lowered independently of the other. Once the proper spaced relation between the heads has been secured, accurately to within a thousandth of an inch or so of a desired dimension, the nut 144 is tightened detachably to lock the wheels together and thereafter the two heads may be adjusted together to the proper elevation. The advantage in this feature it is thought will be apparent since it eliminates considerable jogging of the heads with reference to one another to get them into proper position when the machine is being set up.

*Mounting of scoring saw motors on the heads. (See Figs. 3, 4 and 5.)*

The scoring saws 23, as shown in Fig. 6, have to be set in a certain position of horizontal adjustment with reference to the tenoning heads 25 and it will also be manifest that they must be adjusted to a certain position in a vertical plane with reference to the tenoning heads in order that the scoring cut will be made at the inner end of the tenon to be cut and also to the proper depth, that is, at least to penetrate the veneer of the stock. For these reasons we prefer to mount the scoring saw motors 24 directly on the tenoning head motors 26 to facilitate the adjustment of the scoring saws with reference to the tenoning heads. Then, once the scoring saws have been set they require no further attention in the setting of the tenoning heads in proper spaced relation and to the proper elevation. The motors 26 have vertical ways 147 provided on the side of the housings thereof. Brackets 148 for mounting the motors 24 are received on said ways and arranged for vertical adjustment relative thereto by means of the hand wheels $24^a$, previously referred to. The latter operate worms 149 meshing with spiral gears 150 to operate screws 151. The screws 151 operate in threaded openings in lugs 152 provided on the brackets 148. It will now be clear how the scoring saws are adjusted vertically. In regard to the horizontal adjustment it will be noticed that the brackets 148 have horizontal ways 153 thereon to receive the dovetailed bases 154 provided on the housings of the motors 24. The hand wheels $24^b$ simply operate screws 155 to communicate back and forth movement to the motor 24 relative to the brackets 148. The operation of the mechanism just described is believed to be clear; the adjustment of the scoring saws with reference to the tenoning heads is entirely unaffected by any changes in the adjustment of the tenoning head either vertically, horizontally or angularly by reason of the fact that each scoring saw motor is a part of the same unit with the tenoning head motor related thereto.

*Hollow one-piece frames for right and left hand units. (See Figs. 2-5.)*

The fact that as many as six motors or even more have to be mounted in each unit for the operation of the saws and cutter heads and that these motors have to be arranged in variable spaced relation necessarily presents a serious problem as to the matter of properly supporting the same. According to the present invention we have provided in place of a pair of separate standards for each unit, one whereon to mount the trim saw motor and the other whereon to mount the tenoning head motors with the scoring saw motors on one side of the standard and the coping head motor on the other side, a single one-piece hollow frame of generally rectangular form. This frame provides the two standards at the two sides thereof and the connecting arch between the two sides provides sufficient reinforcement so that it does not become necessary to make the frames nearly so massive. Hence there is a saving in expense and the machine is also of a much better appearance. As previously described, the frames referred to are the frames 81 wherein the one side 80 provides one standard and the other side 89 the other standard, the side 80 having mounted thereon on one side within the frame the tenoning head motors 26 with the motors 24 astride the same, while the coping head motor 28 is mounted on the diametrically opposite side, the other side 89 of the frame providing ways on the outside of the frame for the mounting of the trim saw motor 22. The two sides are joined by an integral connecting arch 156, thus rendering it unnecessary for either of the side standards 80 and 89 to be nearly as massive in construction as might otherwise be necessitated. The frame is cored out as far as possible, as indicated in Figs. 4 and 5, to further conserve in material, reduce weight and save expense.

It is believed the foregoing description conveys a full understanding of the various objects and advantages of our invention. It will, no doubt, be understood that whereas the present description has made reference to one particular embodiment of our invention the invention is capable of adaptation in a great variety of forms. The claims are, therefore, entitled to construction for the purpose of covering any and all modifications and adaptations coming within the spirit and purpose of the invention.

We claim:

1. In a double-end machine of the character described, a base, right and left hand units mounted on said base, at least one of said units being slidably and adjustably mounted whereby to permit changing the spaced relationship of said units, an adjusting screw for changing the spaced relation of said units, means having connection with the screw for operating the same, an indicator having connection with the screw to be operated by the latter and serving to show the distance between the units at any point of adjustment, and means under manual control for controlling the operation of the screw operating means, the indicator and the last mentioned means being disposed in close relationship substantially as and for the purposes described.

2. In a double-end machine of the character described, a base, right and left hand units mounted on said base, at least one of said units being slidably and adjustably mounted whereby to permit changing the spaced relationship of said units, an adjusting screw for changing the spaced relation of said units, power operated means having connection with said screw for operating the same, a manually operable device for controlling the operation of said power means, the said power means serving as a coarse adjustment means, manually operable means normally held yieldingly out of operative relation with said screw but arranged to be forced into operative relation therewith to operate the same, a hand wheel for operating said means, the hand means constituting a fine adjustment means, and an indicator connected with the adjusting screw to be operated thereby, and serving to indicate accurately the distance between the units at any point of adjustment thereof, the said indicator being disposed in one group with the hand wheel and the hand-operable device substantially as and for the purposes herein described.

3. In a machine of the character described, the combination with a base, a pair of units mounted on said base, normally occupying fixed positions in spaced relation for operation on both ends of a piece of stock, and an adjusting screw having means for operating the same and arranged when operated to adjust the relation of the units with respect to one another for different lengths of stock, of means operated through positive gearing from the adjusting screw when the spaced relation of the units is adjusted and arranged to indicate the distance between the units so as to indicate the length of stock which may be operated upon, said means including a part arranged to be released from connection with the positive gearing for manual operation for manually adjusting the indicator independently of adjustment in the spaced relation of the units substantially as described.

4. In a machine of the character described, a base, a pair of units mounted on said base, normally occupying fixed positions in spaced relation for operation on both ends of a piece of stock but adapted for adjustment in relation to one another for different lengths of stock, a screw for communicating the relative movement, power means for driving said screw for large adjustments and having a hand-operable control, hand operable means for small adjustments, and a pair of dials for indicating the distance between the units and thereby indicate the length of stock that may be operated upon, one of which is graduated in large units and the other of which is graduated in small units, said last mentioned dial having a reduction driving connection with the first dial, the connection being such that the first dial is advanced step by step during continuous turning of the other dial, the control for the power means, the hand-operable means, and the pair of dials being disposed in one group for convenience in adjustment of the pair of units, substantially as described.

5. In a machine of the character described, the combination with a pair of units arranged to be placed in variable spaced relation for operation on opposite ends of a piece of stock, the adjustment in spaced relation serving to adapt the machine to operation on different lengths of stock, and an adjusting screw extending between the units for varying the spaced relation therebetween, and having means for operating the same, of an index shaft bearing an indicating dial, means providing a detachable driving connection between said shaft and said screw, and means manually operable for operating said index shaft independently of the screw when the shaft is detached from operating connection therewith.

6. In a machine of the character described, a standard having cutter disposed thereon for operation on the end of a piece of work fed past the same, a feed bed alongside the heads over which the work is fed and from which the end of the work projects toward the heads, a pressure bar above the feed bed for operation on top of the work near the end thereof to hold the same in proper position for operation thereon, the said pressure bar being therefore immediately adjacent the cutter heads, means for hingedly mounting said pressure bar relative to the standard on a vertical axis to permit swinging movement thereof in a horizontal plane away from the cutter heads, the said bar when swung to an out of the way inoperative position being arranged to be supported solely by its hinge mounting, and means normally holding said pressure bar in operative position.

7. A structure as set forth in claim 6 wherein the pressure bar is supported on a bracket vertically adjustable on the standard to permit elevation of the pressure bar relative to the feed bed, the bracket being disposed intermediate the ends of the pressure bar and having an extension toward one end of the latter, the pressure bar being hingedly mounted on the outer end of said extension, and the means for fastening the pressure bar in operative position having engagement with the bracket proper at a point substantially spaced from the said hinge.

8. In a machine of the character described, comprising a pair of spaced units having means thereon for operating on the respectively opposite ends of a piece of work fed therebetween, and a feed bed between said units including a pair of feed chains having dogs thereon for engagement with the work to convey the same through the machine, the two chains being spaced toward opposite ends of the feed bed for engagement with the respective ends of the work, the combination with a feed shaft, and one of the sprockets thereon for operating said chains, of means for rotatably adjusting the sprocket relative to the same in any degree of adjustment comprising a gear fixed on and turning with one of said elements, and a worm meshing therewith and rotatable in a part fixed on and turning with the other of said elements, said worm having a part accessible for turning the same, the said adjusting means being arranged to turn with the shaft and the sprocket as a unit and having the worm and gear thereof together with the part of the worm adapted to be operated for adjustment arranged so as to have operating clearance with adjacent parts of the machine.

9. A structure as set forth in claim 8 wherein the gear is fixed on and turns with the shaft, and the worm meshing therewith is rotatable in a part fixed on and turning with the sprocket.

10. In a machine of the character described, the combination with a feed bed, of a standard alongside the same having tool-carrying slides above and below the plane of the top of the bed for operation of tools on the top and under sides of a piece of stock fed thereto on the bed, separate means for adjusting the elevation of the top and bottom slides whereby to permit individual adjustment of either of the slides independently of the other and vary the spaced relation therebetween, and means for detachably interlocking the two last mentioned means frictionally whereby both may, when interlocked, be operated to like degrees by the operation of one, and they may be interlocked in any position of relative adjustment.

11. In a machine of the character described, the combination with a feed bed, of a standard alongside the same having tool-carrying slides above and below the plane of the top of the bed for operation on the top and under sides of a piece of stock fed thereto on the bed, separate adjusting screws for changing the elevation of the slides, separate hand wheels for adjusting said screws, said hand wheels being arranged co-axially alongside one another and arranged normally for individual operation each independently of the other, and means for interlocking said wheels whereby the adjustment of one produces the same adjustment of both slides.

12. In a machine of the character described, the combination with a standard and a feed bed operating alongside the same to feed work thereto, of devices mounted on the standard for operation above and below the plane of the top of the feed bed to operate on the work from the top and bottom sides thereof, means for adjusting the elevation of certain of said devices in relation to the top side of the work, another means for adjusting the elevation of certain other devices in relation to the bottom side of the work, and means whereby the two last mentioned means may be detachably locked together frictionally for the simultaneous adjustment of said devices, the frictional locking together of said means permitting the same to be locked together in any position of relative adjustment of said devices.

13. In a tenoner machine, the combination of a feed bed for feeding work to be operated upon, a standard alongside the same having a tenoning head mounted thereon normally at a different elevation from the plane of the bed to operate on one side of the work, a drive motor for said head, means for adjusting the elevation of said drive motor, a scoring saw arranged to operate in front of the tenoning head to mark off by scoring in the surface of the work the area to be operated upon by the tenoning head, and a drive motor for said scoring saw, said motor being mounted on the first mentioned drive motor whereby a change in the elevation of the tenoning head correspondingly changes the elevation of the scoring saw.

14. In a structure as set forth in claim 13 wherein the scoring saw motor is normally fixed in relation to the tenoning head motor, the provision of means for adjusting the elevation of the one motor relative to the other motor.

15. In a structure as set forth in claim 13 wherein the scoring saw motor is normally fixed in relation to the tenoning head motor, the provision of means for adjusting the elevation of the one motor relative to the tenoning head motor, and means for adjusting the one motor axially relative to the other motor.

16. In a multiple motored machine of the character described, the combination of a feed bed, a frame mounted alongside the same, and a plurality of tools mounted on said frame for operation on work fed thereto on the bed, said tools having separate drive motors for operating the same, and certain of said tools being arranged to operate in a predetermined relation to certain other tools, the motors of certain associated tools being mounted on the motors of their related tools in the relationships required.

17. In a tenoner machine, the combination with a feed bed, of a unit disposed alongside the same comprising a one-piece hollow frame providing two standards in fore and aft spaced relation joined by a connecting reinforcing arch at the upper ends thereof, a motor mounted on one of said standards having a trim saw driven thereby for cutting stock to a desired length, a pair of motors mounted on one side of the other standard above and below the plane of the bed for operating tenoning heads for cutting a tenon of a thickness determined by the spaced relation of the heads, and another motor mounted on the last mentioned standard on the other side thereof for operating a coping head for operation on the end of the tenon.

18. In a double-end tenoner, the combination with a feed bed, of right and left hand units at opposite sides of the bed, each of said units comprising a frame, a motor mounted in a forward position on said frame having a trim saw operated thereby for cutting off stock to a predetermined length as it is fed past the same, a pair of co-related motors mounted on said frame above and below the plane of the bed rearwardly in relation to the first motor, and having tenoning heads operated thereby for operation on the top and bottom sides of the work to cut a tenon the thickness of which is determined by the spaced relation of the heads, and another pair of motors between the last mentioned motors and the first mentioned motor for operating scoring saws in a predetermined relation both to the trim saw and to the tenoning heads to mark off by scoring in the top and bottom sides of the stock the areas to be operated upon by the tenoning heads.

19. A machine as set forth in claim 18 wherein the scoring saw motors are mounted on the tenoning head motors for adjustment therewith while maintaining a predetermined relation between each scoring saw and its related tenoning head.

20. In a double-end tenoner, the combination with a feed bed, of right and left hand units at opposite sides of the bed, each of said units comprising a frame, a motor mounted in a forward position on said frame having a trim saw operated thereby for cutting off stock to a predetermined length as it is fed past the same, a pair of co-related motors mounted on said frame above and below the plane of the bed rearwardly in relation to the first motor, and having tenoning heads operated thereby for operation on the top and bottom sides of the work to cut a tenon the thickness of which is determined by the spaced relation of the heads, another pair of motors between the last mentioned motors and the first mentioned motor for operating scoring saws in a predetermined relation both to the trim saw and to the tenoning heads to mark off by scoring in the top and bottom sides of the stock the areas to be operated upon by the tenoning heads, and another motor rearwardly disposed with respect to the tenoning head motors having a coping head operated thereby in a predetermined relation to the tenoning heads and the bed for operation on the end of the tenon produced by the tenoning heads.

21. In a double-end machine of the character described, a base, a unit fixed on one end of said base, another unit slidably and adjustably mounted on ways provided on said base for movement toward and away from the other end of said base, both of said units having tools thereon for operating on both ends of a piece of work, an adjusting screw extending from the fixed unit to the movable unit for adjusting the latter back and forth, one means for operating said screw comprising a power means arranged for clutch connection with the screw, and another screw-operating means manually operable, normally held yieldingly out of operative relation to the screw but arranged to be forced into operative relation with the screw at will, the power means constituting a coarse adjustment means and the hand means a fine adjustment means.

22. A structure as set forth in claim 21, including a pair of dials driven through a connection with the screw, the one dial having a reduction driving connection with the other dial, the first dial indicating fine adjustments and the second dial coarse adjustments whereby to indicate roughly by means of the second dial during power operation of the screw the distance between the two units and whereby to indicate with precision by means of the first dial during hand adjustment the distance between the two units so as to enable setting the machine for different lengths of stock.

23. In a machine of the character described, a base, a pair of units mounted on said base, normally occupying fixed positions in spaced relation for operation on both ends of a piece of stock but adapted for adjustment in relation to one another for different lengths of stock, a screw for communicating the relative movement, coarse and fine adjustment means adapted to operate the screw and a pair of dials operated by the screw for indicating the distance between the units and thereby indicate the length of stock that may be operated upon, one of which is graduated in large units and serves to indicate to within a small fraction of a unit the distance between the pair of units and the other of which is graduated in small units and serves to indicate small adjustments in the spacing of the pair of units, said last mentioned dial having a reduction driving connection with the first dial, the connection being such that the first dial is advanced step by step during continuous turning of the other dial.

24. In a machine of the character described, the combination with a pair of units arranged to be placed in variable spaced relation, and an adjusting screw extending between the units arranged when turned to produce relative movement between the units, of an index shaft for operating a gauge for indicating the spaced relation between the units, means providing a driving connection between said shaft and screw comprising a pair of intermeshing gears, one of which turns the shaft and the other of which is arranged to be placed detachably in driving relation to the screw, means manually operable for operating the last mentioned gear when the same is detached from driving relation with the screw, and means providing a driving connection between said gear and said screw.

25. A structure as set forth in claim 24 wherein the pair of intermeshing gears provide a driving connection between the index shaft and the screw within a housing, and wherein the manually operable means for operating one of said gears comprises a part turning with the gear and projecting out of the housing to be accessible for turning by hand, the means providing a driving connection between the gear and the screw comprising a nut outside of the housing arranged to be tightened toward the last mentioned part and arranged detachably to fix the latter with said gear for rotation with the screw.

26. In a machine of the character described, the combination with a work support, of a tool support having a plurality of tool heads mounted thereon for operation on the work, separate adjusting screws having connection with the housings for said heads for moving the same, separate hand wheels for adjusting said screws, said hand wheels being arranged substantially coaxially and having bearing portions disposed for abutting relation, and means for forcing the wheels together to hold the same by their bearing portions for operation in unison whereby the adjustment of one produces like adjustments of all of said heads.

27. In a tenoner machine, the combination of a feed bed for feeding work to be operated upon, a standard alongside the same having a tenoning head mounted thereon normally at a certain elevation with respect to the plane of the bed to operate on one side of the work, means having connection with the housing of said head for adjusting the elevation thereof, a scoring saw arranged to operate in front of the tenoning head to mark off by scoring in the surface of the work the area to be operated on by the tenoning head, and a housing for said saw mounted on the housing for the head whereby a change in the elevation of the head correspondingly changes the elevation of the saw and does not disturb the predetermined relation between the head and saw.

28. A structure as set forth in claim 27 including means for adjusting the one housing relative to the other whereby to vary the relation between the scoring saw and the tenoning head.

29. A structure as set forth in claim 27 including means for adjusting the housing of the scoring saw on the housing of the tenoning head whereby to adjust the elevation of the scoring saw with respect to the head and the axial relation therebetween.

30. In a tenoner machine, the combination with a feed bed, of a unit disposed alongside the same comprising a one-piece hollow frame providing two standards in fore and aft spaced relation joined by a connecting reinforcing arch at the upper ends thereof, a motor mounted on one of said standards having a trim saw driven thereby for cutting stock to a desired length, a pair of motors mounted on one side of the other standard above and below the plane of the bed for operating tenoning heads for cutting a tenon of a thickness determined by the spaced relation of the heads, a pair of motors mounted between the last mentioned motors and the first mentioned motor for operating scoring saws in a predetermined relation both to the trim saw and the tenoning heads to score the work at the point operated upon by the tenoning heads, and another motor mounted on the last mentioned standard on the other side thereof for operating a coping head for operation on the end of the tenon.

31. A tenoner machine as set forth in claim 30 wherein the scoring saw motors are adjustably mounted on the tenoning head motors whereby once a predetermined relation between the scoring saws and the tenoning heads is obtained the relation is not disturbed in the adjustment of said tenoning heads.

32. In a tenoner machine, the combination with a feed bed, of a unit disposed alongside the same comprising a one-piece hollow frame providing two standards in fore and aft spaced relation joined by a connecting reinforcing arch at the upper ends thereof, a motor mounted on one of said standards having a trim saw driven thereby for cutting stock to a desired length, and a pair of motors mounted on one side of the other standard above and below the plane of the bed for operating tenoning heads for cutting a tenon of a thickness determined by the spaced relation of the heads.

33. In a machine of the character described comprising a standard having cutter heads disposed thereon for operation on the end of a piece of work fed past the same, and a feed bed alongside the standard over which the work is fed to the heads, a pressure bar above the fed bed for holding the work in proper position for operation thereon by the heads, means for pivotally supporting the bar on a vertical axis near one end for swinging movement in a horizontal plane toward and away from the standard, said bar when swung to an out of the way inoperative position being arranged to be supported solely by its pivot, and means spaced substantially from the aforesaid pivot toward the other end of said bar for supporting and detachably holding said bar in its normal operative position.

34. In a machine of the character described comprising a standard having cutter heads disposed thereon for operation on the end of a piece work fed past the same, and a feed bed alongside the standards over which the work is fed to the heads, a pressure bar above the feed bed for holding the work in proper position for operation thereon by the heads, means for pivotally supporting the bar on a vertical axis near one end for swinging movement in a horizontal plane toward and away from the standard, said bar when swung to an out of the way inoperative position being arranged to be supported solely by its pivot, said standard having two portions disposed alongside the bar in its normal position intermediate the ends of the latter, and means on the bar arranged for engagement with both of said portions for supporting the bar at two points in addition to the pivot support, said means providing a quickly detachable connection between said bar and both of said standard portions.

35. In a machine of the character described comprising a standard having cutter heads disposed thereon for operation on the end of a piece of work fed past the same, and a feed bed alongside the standard over which the work is fed to the heads, a bracket slidably supported on said standard for adjustment in elevation relative to the bed and also relative to the cutter heads, and a pressure bar mounted on said bracket to be adjusted therewith in elevation relative to the bed, said bar being pivoted near one end on a vertical axis on said bracket for swinging movement relative to the standard in a horizontal plane, whereby when swung to an inoperative position the bar is supported solely by its pivot.

36. In a machine of the character described comprising a standard having cutter heads disposed thereon for operation on the end of a piece of work fed past the same, and a feed bed alongside the standard over which the work is pivoted near one end on a vertical axis on said bracket for swinging movement relative to the standard in a horizontal plane whereby when swung to an inoperative position the bar is supported solely by its pivot, and means providing a quickly detachable connection between said bar and said bracket at a point spaced substantially from said pivot toward the opposite end of said bar whereby in the normal operative position thereof the bar is supported and held at two points spaced longitudinally thereof.

37. In a machine of the character described comprising a base having a pair of units mounted thereon and arranged to be disposed in variable spaced relation, and a feed bed including a pair of feed chains on said units for conveying work through the machine, a splined feed shaft extending between said units, a pair of sprockets for operating said chains mounted on said shaft, one of said sprockets being splined for a sliding driving connection with said shaft and the other sprocket being rotatably adjustable on said shaft, and means for adjusting and locking the last mentioned sprocket to position the same in any degree of adjustment relative to the shaft, said means comprising a worm gear splined on the shaft, a collar turning with the sprocket, and a worm rotatably mounted in said collar and meshing with the worm gear.

38. A structure as set forth in claim 37 including a plate mounted on the collar and enclosing the worm and worm gear, said plate being arranged to clamp the worm gear to the collar so as to be fixed for rotation with the sprocket.

JUDSON H. MANSFIELD.
CHRISTY A. WIKEN.